United States Patent [19]

Heun

[11] Patent Number: 4,863,241
[45] Date of Patent: Sep. 5, 1989

[54] PRINTER'S LOUPE

[76] Inventor: Gary J. Heun, S65 W12558 Byron Rd., Muskego, Wis. 53150

[21] Appl. No.: 179,960

[22] Filed: Apr. 11, 1988

[51] Int. Cl.$^4$ .......................... G02B 7/02; G02B 27/02
[52] U.S. Cl. ...................................... 350/252; 350/238
[58] Field of Search ............... 350/235, 236, 238, 239, 350/240, 245, 252

[56] References Cited

U.S. PATENT DOCUMENTS

| | | |
|---|---|---|
| 1,179,142 | 4/1916 | Shaughnessy . |
| 2,056,693 | 10/1936 | Stanley . |
| 2,110,310 | 3/1938 | Shayes et al. ........................ 250/34 |
| 3,628,871 | 12/1971 | Himmelstrup ...................... 356/189 |
| 4,457,585 | 7/1984 | DuCorday .......................... 350/245 |

FOREIGN PATENT DOCUMENTS

2821002 11/1979 Fed. Rep. of Germany ...... 350/238

*Primary Examiner*—Bruce Y. Arnold
*Assistant Examiner*—J. P. Ryan
*Attorney, Agent, or Firm*—Foley & Lardner

[57] ABSTRACT

A printer's loupe for facilitating the on-cylinder repair of printing plates in a web-fed printing press. A self-contained hand held unit having integral means for illuminating the surface to be inspected comprises a magnifying viewing lens and a rubber magnet for mounting the device to the curved outer surface of a printing plate on a printing cylinder. A curved bottom portion of the device generally conforms to the radius of the print cylinder.

16 Claims, 3 Drawing Sheets

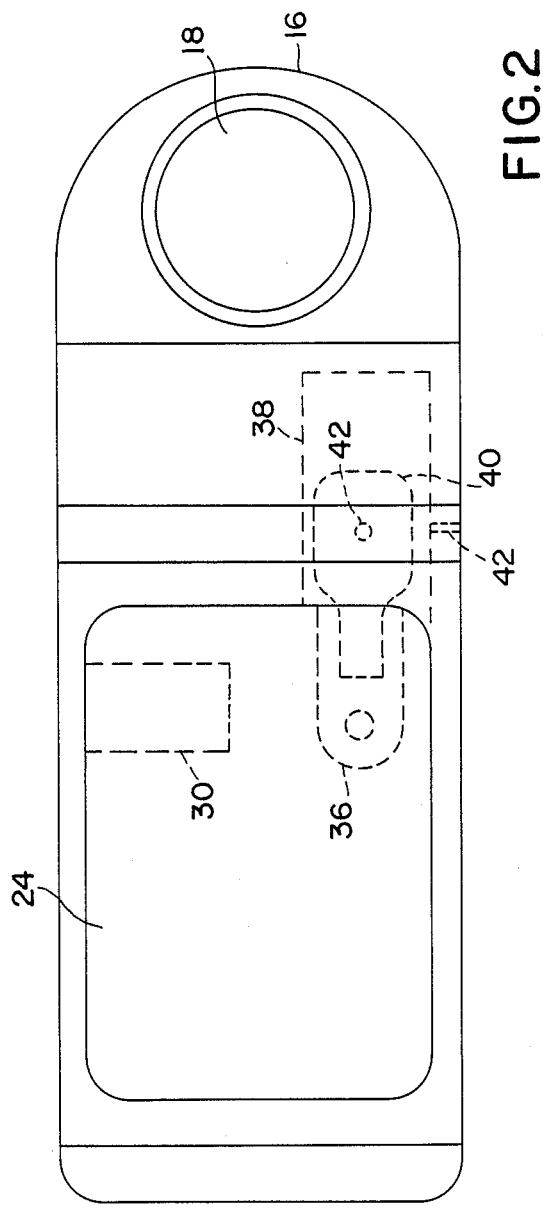
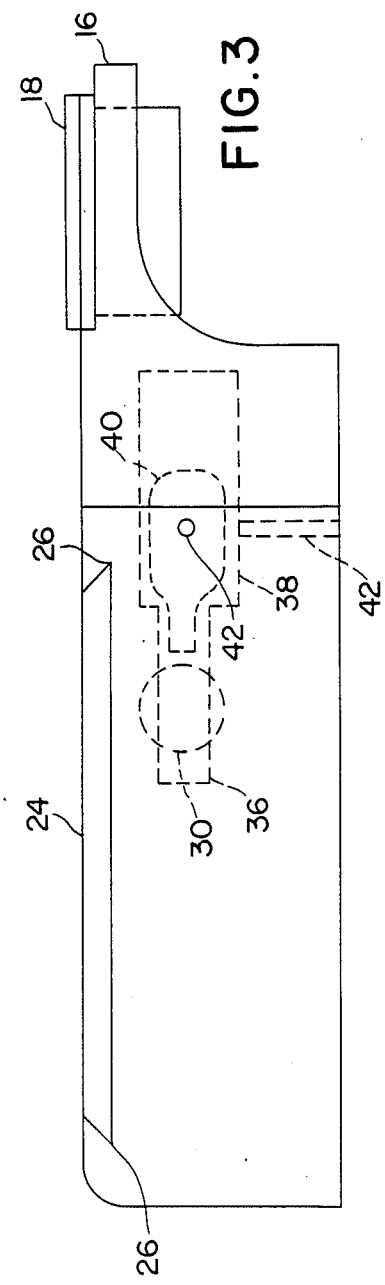

PRINTER'S LOUPE

TECHNICAL FIELD

This invention relates, generally, to a device employed in the repair of plates used in connection with a web-fed printing press, and more particularly, to a magnetically self-supporting illuminated magnifier loupe for the "on-cylinder" repair of printing plates.

BACKGROUND OF THE INVENTION

In a web-fed printing press, a web of material, typically paper, is fed from a storage mechanism, such as a reel stand, to one or more printing units which imprint the web with images (signatures). The imprinted web is then typically driven through respective processing units such as a dryer unit, coding equipment, and a cutting apparatus. The web-fed system allows for high volume production of signatures from each printing plate because of the rate, for example 1,700 feet per minute, at which the web moves past the printing cylinder.

Printing cylinders are typically approximately 7¼ inches in diameter, having a circumference of approximately 22¾ inches. The signature image is produced on the surface of an aluminum printing plate, the printing plate being mounted about the circumference of the print cylinder.

As the web travels through the press, it comes into contact with the printing plate as the printing cylinder rotates. The printing plate imprints an image onto the web corresponding to the printing plate's image surface. The image surface of the plate comprises a highly ordered matrix of small dots, typically on the order of 10,000–15,000 per square inch. The image printed on the web is set off by a background, corresponding to the nonprinted regions of the image. This background corresponds to the nonimage surface of the printing plate. To maximize print quality, it is imperative that the nonimage surface of the plate be kept clean so that the printed image is set off against a clean background.

As the continuous web travels through various printing stages, the signatures are inspected for printing flaws. For example, a crack or scratch in the nonimage surface of the plate may accumulate ink, resulting in a marred printed page. In addition, dust or debris from the web or the environment may become lodged between the dots, resulting in a defective printed image. A defective plate produces a phenomenon called "stippling", or a marring of the printed page. When stippling is detected, it is necessary to correct the problem immediately, which entails shutting down the entire web-fed press operation. This disrupts time schedules, which are extremely important in the context of daily or weekly news publications, for example. Moreover, down-time results in considerable wastage due to the high speed of operation. Thus, while occasional stippling is unavoidable, it is desirable to correct the problem and resume press operation as quickly as possible.

The manner in which a marred printing plate is repaired depends on the seriousness of the flaw. A major defect in the print plate often requires removal of the plate from the cylinder and repair, reconstruction or replacement of the plate. For minor adjustments, such as removal of extraneous particles from the plate surface, lithographers often perform "on-cylinder" repair. It is desirable, to the extent possible, to repair the plate without removing it from the cylinder, thus minimizing press down-time.

Presently known methods of print plate repair typically require two persons working simultaneously. Because of the fine detail work involved, the immediate stippling region must be illuminated. One person typically directs illumination to the work site, while another person performs the repair. When performing on-cylinder repair of a printing plate, it is essential that the plate not be bumped, scratched, dented or marred in any way. This makes it difficult to attach illumination or magnification equipment to the cylinder surface. Consequently, lithographers typically attempt to hold a magnifying lens in one hand and a stipple in the other hand. A stipple is a pencil-like instrument having a sharp, pointed extension which is used to cross-hatch between the dots to clean the surface of the print plate. Much skill and dexterity is involved, as the dots are quite small and very close together. The lithographer must repair the stippling, as quickly as possible, being careful not to scratch or in any way impair the surface of the printing plate, and at the same time illuminate and magnify the stippled region. In addition, because of the inherently limited space available in a press room, it is difficult to accommodate more than one person at a time.

SUMMARY OF THE INVENTION

The present invention facilitates the on-cylinder repair of printing plates by a single person. The device is a self-contained unit, made from a material which is softer than, and thus will not scratch, the surface of the printing plate. The device contains an integral lamp and power source for illuminating the workspace, an integral magnet for attaching the device to the cylinder, and an integral magnifying lens. These features enable a lithographer to use both hands in performing the repair operations.

BRIEF DESCRIPTION OF THE DRAWING

A preferred exemplary embodiment of a printer's loupe in accordance with the present invention will hereinafter be described in conjunction with the appended drawing, wherein like designations denote like elements, and;

FIG. 2 is a plan view of the top of the loupe;

FIG. 3 is a side view of the loupe of FIG. 2;

DETAILED DESCRIPTION OF A PREFFERED EXEMPLARY EMBODIMENT

Figure 4:
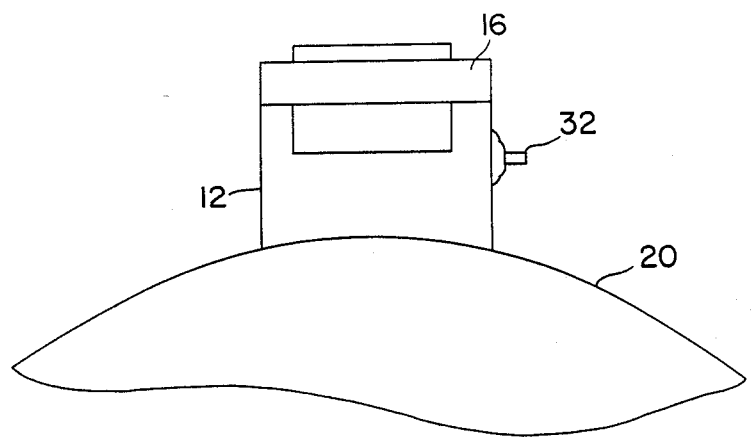
FIG. 4 is an end view of the loupe, shown magnetically secured to a printing cylinder.

Referring now to FIGS. 1–4, a printer's loupe 10 in accordance with the present invention comprises a generally hollow body 12, having a curved bottom face 14 and a thin frame member 16 for supporting a lens 18. As best seen in FIG. 4, the radius of bottom surface 14 corresponds to the radius of the print cylinder 20 to facilitate mating engagement of loupe 10 to the surface of cylinder 20. In a preferred embodiment, a lens 18 is rigidly attached to lens holder (frame) 16 of body 12 for viewing the workspace when loupe 10 is secured to cylinder 20. Rigid attachment implies that lens 18 is maintained at a fixed distance from the work surface. Lens 18 is disposed with respect to the work surface at a distance consistent with its focal length. Thus, proper selection of lens power results in immediate focusing and consistent magnification from plate to plate. Alternatively, lens 16 may screw or slide into lens holder 16 so that the focal length may be varied to effect varying degrees of magnification.

Figure 1:
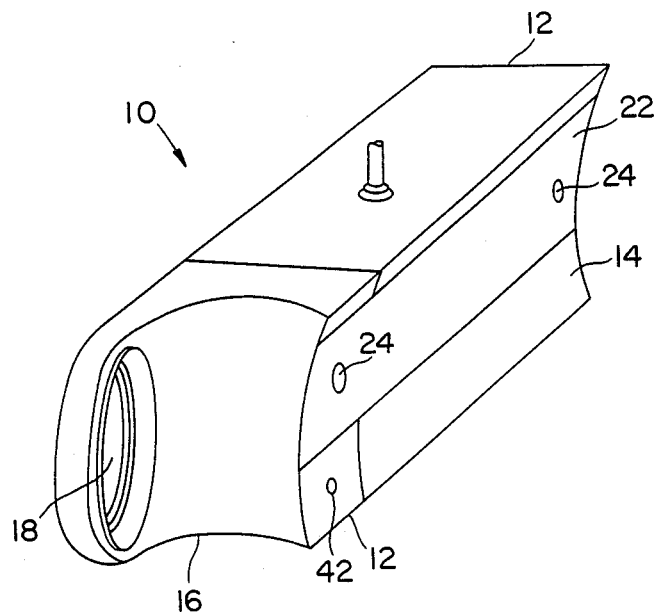
FIG. 1 is a perspective view of an exemplary printer's loupe in accordance with the present invention.

With continued reference to FIG. 1, a magnet 22 is disposed flush with curved surface 14 and held in place by respective fasteners 44, e.g., screws, rivets, or dowels. Fasteners 24 may be plastic or any suitable material, but should be recessed slightly beneath surface 14 to avoid contact with the printing plate surface. Magnet 22 facilitates the repair of cylinders having horizontal axes, which is otherwise particularly difficult because of the effect of gravity.

A rubber magnet is highly preferred to prevent damage to the printing plate surface. Moreover, a rubber magnet can be machined simultaneously with curved surface 14 during manufacture to achieve the desired radius of curvature.

Body 12 is preferably made from clear, lightweight plexiglass. Use of a lightweight material helps minimize the size of the magnet necessary to adhere the loupe to the print cylinder, thus reducing total cost of the loupe. In addition, a clear body facilitates diffusion of light to the work surface.

Figure 5:
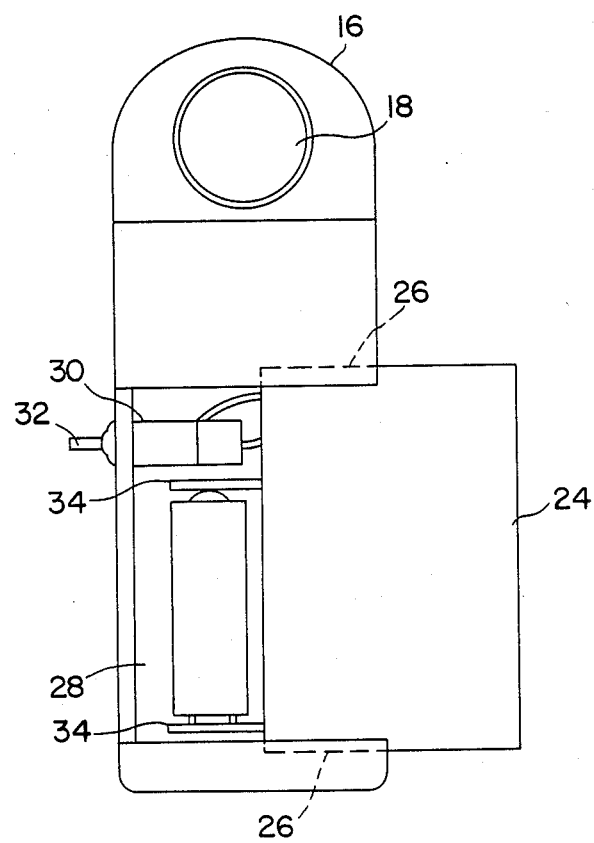
FIG. 5 is a top view of the loupe of FIG. 2, shown with the slidable door partially open.

Referring now to FIGS. 2, 3 and 5, loupe 10 preferably includes a slidable door 24 having dovetail edges 26 for facilitating slidable engagement with body 12. In FIG. 2, door 24 is shown in the closed position; in FIG. 5, door 24 is shown in a partially open position. Door 24 allows access to a cavity 28 located in the interior of body 12. Disposed within cavity 28 are: power source connections 34, for example, battery terminal contactors; a switch housing 30 for receiving a switch 32; a bulb socket 36; and a bulb housing 38 for receiving an illumination source, for example, a light bulb 40. In a preferred embodiment, a light bulb is electrically connected to and intermittently powered by a battery in response to actuation of switch 32. Switch 32 may be a toggle switch, a spring loaded depression switch, or any conventional switch capable of initiating and terminating electrical communication between the power source and the light bulb in response to manual operation. Similarly, the battery, bulb, and bulb housing may be any suitable size, shape or configuration to provide adequate illumination at a minimum weight. In a preferred embodiment, slidable door 24 is the same width as body 12 to facilitate convenient removal and replacement of the power source and light bulb.

Referring again to FIGS. 1-3, one or more vent holes 42 are disposed in body 12 to allow cooling of the lamp region. Vent holes 42 preferably extend from bulb housing 38 to the external surface of body 12.

The loupe of the present invention may be used in the on-cylinder repair of printing plates in the following manner. When stippling is detected pursuant to observed imperfections in the images imprinted on a moving web, the web-fed printing process is temporarily shut down. A lithographer is dispatched to the marred cylinder equipped with loupe 10. When the lithographer arrives at the cylinder, switch 32 is depressed to illuminate the light bulb contained within loupe 10. After the stippled region is isolated, loupe 10 is gently placed on the surface of print cylinder 20 so that curved bottom 14, including magnet 22, contacts the circumference of cylinder 20. Loupe 10 is positioned so that lens 18 is placed above the stippled region. If lens 18 is slidably mounted in lens holder 16, the desired degree of magnification may be obtained by manipulating the position of lens 18. Clear plexiglass body 12 permits the light from the internal bulb to defuse to the stippled surface. The lithographer looks through lens 18 and cross hatches between the dots in the stippled region. Since the magnification mechanism and illumination mechanism are both contained within loupe 10, which magnetically adheres to the surface of print cylinder 20, both of the lithographer's hands are free to perform the repairing task.

An important feature of loupe 10 in accordance with the preferred embodiment shown in FIGS. 1-5 is the configuration of lens holder 16. As best seen in FIG. 3, lens 18 may be placed directly above the stippled region, allowing a lithographer to place a stipple between lens 18 and the surface being repaired. Moreover, repair operations may be performed on the stippled surface free from obstruction except for the area occupied by body 12.

It will be understood that, while various configurations have been described, for example a toggle or depressable switching mechanism, they are not presented in a limiting sense. Further, the above description is of preferred exemplary embodiments of the present invention, and the invention is not limited to the specific forms shown in the drawing and described herein. Other modifications may be made in the design and arrangement of the elements within the scope of the invention, as expressed in the appended claims.

I claim:

1. A printer's loupe for use in the repair of a printing plate mounted on a printing cylinder, the loupe comprising:
    a body having integral means for supporting said loupe on the surface of said cylinder, said supporting means comprising a curved bottom having a radius approximately equal to that of said cylinder;
    means, attached to said body, for illuminating said printing plate;
    means, attached to said body and in electrical communication with said illuminating means, for supplying power to said illuminating means;
    means, attached to said body, for demountably securing said body to said cylinder; and
    means, mounted to said body, for magnifying a portion of said printing plate.

2. The loupe of claim 1 wherein said securing means is a magnet.

3. The loupe of claim 2 wherein said magnet is a rubber magnet.

4. The loupe of claim 1 wherein a portion of said curved bottom comprises a magnet.

5. The loupe of claim 4 wherein said magnet is a rubber magnet.

6. The loupe of claim 1 wherein said illuminating means is a light bulb.

7. The loupe of claim 1 wherein said magnifying means is a lens.

8. The loupe of claim 7 further comprising a lens holder, integral with said body, for receiving said lens.

9. The loupe of claim 8 wherein said lens holder is disposed at a fixed distance from said curved bottom.

10. The loupe of claim 9 wherein said lens is securely mounted in said lens holder.

11. The loupe of claim 9 wherein said lens is slidably mounted in said lens holder.

12. The loupe of claim 1 wherein said body is transparent.

13. The loupe of claim 1 wherein said body is plastic.

14. The loupe of claim 1 wherein said body further comprises a sliding door defining one surface of an internal cavity.

15. The loupe of claim 1 wherein said radius is in the range of 3-6 inches.

16. An optic loupe for use in repairing a radiused printing plate attached to the surface of a printing cylinder, said loupe comprising:

a transparent, plastic body having a radiused bottom generally conforming to the radius of said printing cylinder;

a lightbulb secured to said body for illuminating said printing plate;

a rubber magnet attached to said body for magnetically mounting said body to said printing cylinder; and a magnifying lens, attached to said body, said lens disposed at a fixed focal length from said printing plate when said loupe is mounted on said printing cylinder.

* * * * *